March 15, 1938. H. G. LOMBARD 2,110,959
FASTENER
Filed Jan. 14, 1937 2 Sheets-Sheet 2
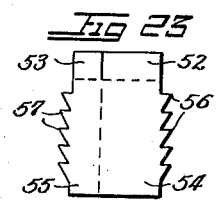
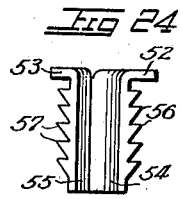
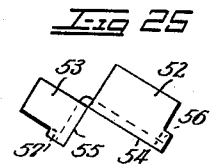
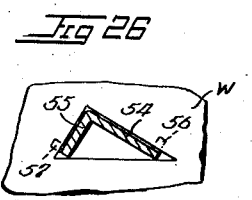
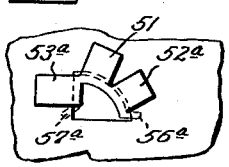
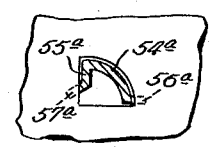
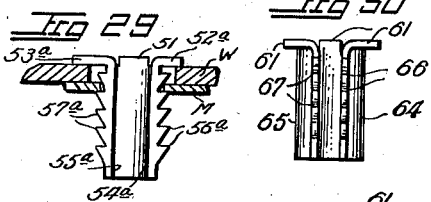
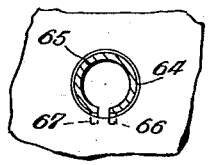
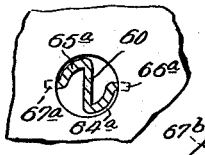
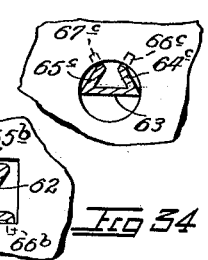
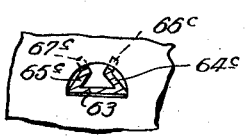
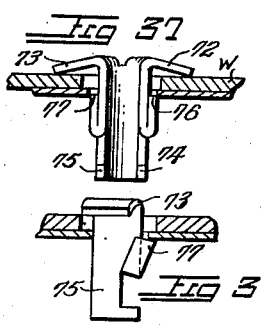
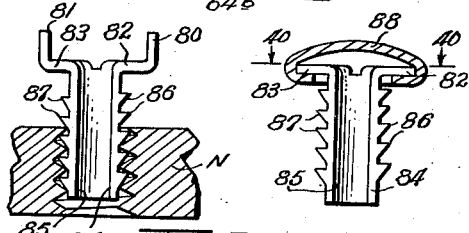
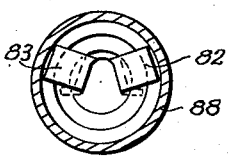
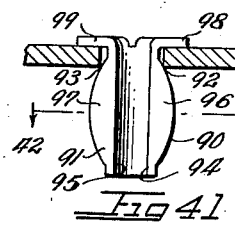
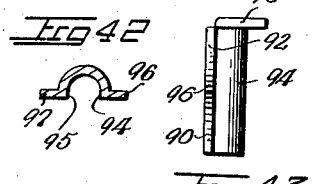
Inventor
Herman G. Lombard
Attorney Patented Mar. 15, 1938

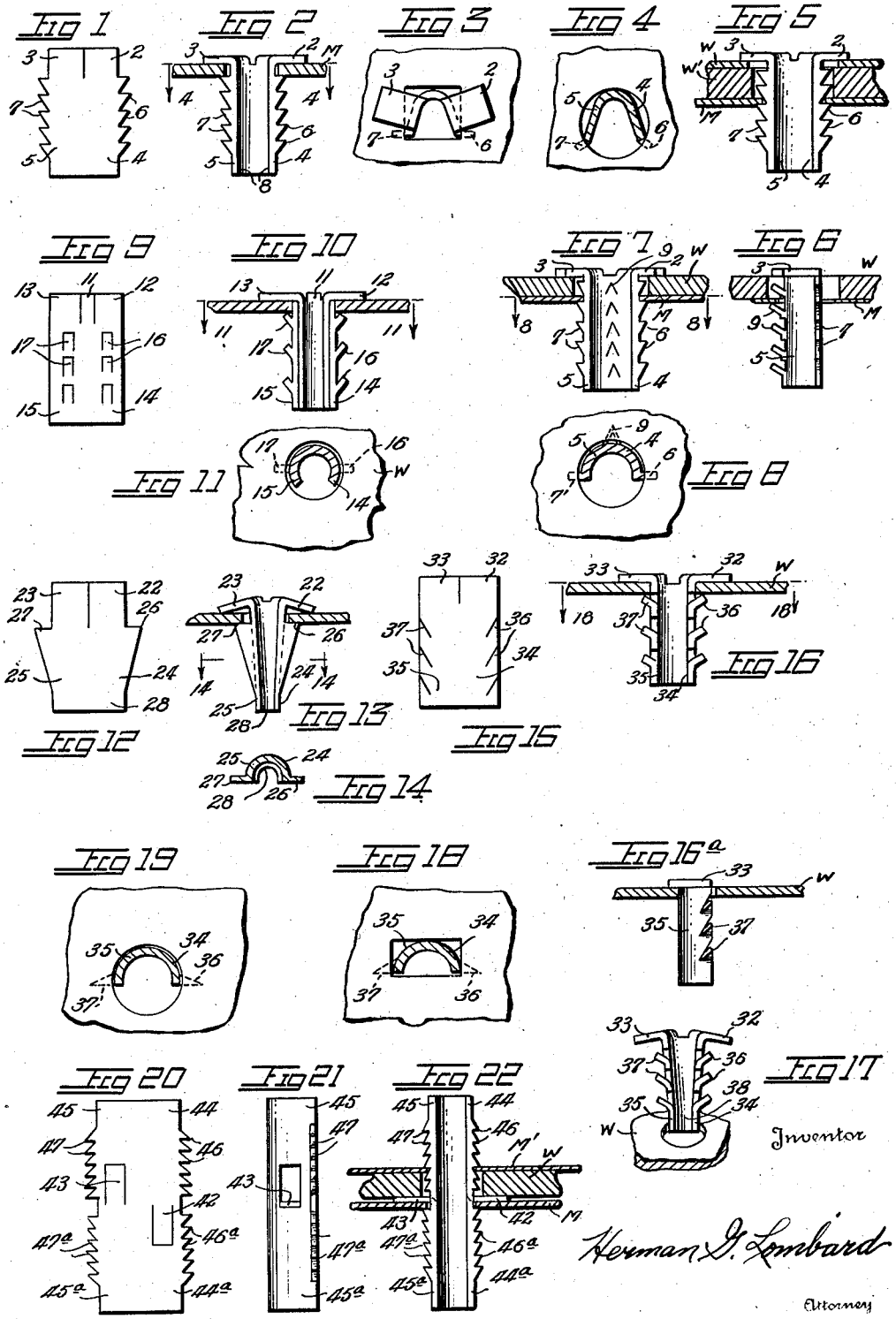

2,110,959

UNITED STATES PATENT OFFICE 2,110,959

FASTENER

Herman G. Lombard, Washington, D. C., assignor to Albert H. Tinnerman, Cleveland, Ohio Application January 14, 1937, Serial No. 120,608

8 Claims. (Cl. 85—5)

This invention relates to fastening devices of general application and more particularly of the type constructed from relatively thin metal material of sheet or strip form such as, for example, sheet spring steel, sheet metal, cold rolled metal, and the like.

The fastening devices of this invention comprise various constructions in which the shank members are composed of relatively yieldable leg or wall sections, the side and free longitudinal edges of which are designed to engage in a work aperture under compression in a friction or press fit. The shank sections of the various devices may be provided with integral lug, shoulder, or abutment means acting in conjunction with such relatively yieldable shank sections whereby a most effective engagement is obtained of the various forms of devices in fastening position in work.

The head members of the various forms of devices are provided from free end sections at the ends of the blanks from which the devices are constructed. These free end sections may be any desired length and consequently may be bent or deformed into any suitable shape for cooperation with or connection to an object or part to be secured to a supporting member.

In general, fastening devices of the type with which this invention deals are constructed of metal sheet material of suitable thickness such as strip stock or blank stampings because of the ease and simplicity with which the devices may be stamped and formed from such material.

In any form of fastening device in which there is obtained a yieldable, relative movement of the shank sections or shank elements, an effective fastening means is provided in that on applying such a device to work in an aperture of less width or diameter than the spacing or overall width of the shank sections, a tension is set up in such sections which tension provides a friction, press fit of the device in fastening position intended to prevent loosening and removal of the device from such position.

Heretofore such fastening devices have been used with a certain degree of effectiveness in applications and installations where no great degree of movement or vibration is present in the work, or members fastened or supported. However, where any degree of strain, jarring or vibration takes place, the shanks of such types of fasteners tend to loosen from their fastening position and usually become completely removed due to the fact that the sections or elements comprising the shank do not possess sufficient holding power and ability under such conditions.

It is therefore an object of this invention to provide various forms of fastening devices in which the shanks are composed of relatively yieldable sections so disposed and arranged with respect to each other as to permit quick, easy insertion of the devices into an aperture in work by flexing and relative yielding thereof, yet, when in fastening position have such a degree of stiffness, rigidity and tension stored therein through contact and compression against the side walls of the aperture that substantial resistance is offered to withdrawal of the devices from fastening position, and extraordinary resistance is provided against loosening, or tendency of the device moving out of applied position of its own accord due to vibration, jarring or strain set up in the members fastened or supported, or in a member in which the device is applied.

It is a further object of this invention to provide various forms of fastening devices in which the shank members are composed of relatively yieldable shank sections which are so spaced in normal relation to each other as to engage the side walls of the work aperture under compression in applied fastening position, thereby effecting a friction or press fit in such fastening position.

A further object of the invention is to provide fastening devices the shank sections of which are designed to be placed under compression against the aperture side walls in fastening position, and which shank sections are provided with series of integral, projecting, or lug means such as shoulders, abutments, or cam surfaces serving to securely engage the work in fastening position, and rigidly retain the shank in such position under tension set up in the shank sections due to the relative contraction, compression, and movement thereof from their normal, spaced relation on being applied to the work aperture and advanced to fastening position, whereby an effective seating and locking of the devices in such fastening position at all times is obtained due to the action of the shank legs attempting to assume their initial, normal, spaced relation.

Further objects of the invention will appear as a description thereof proceeds with reference to the accompanying drawings in which like reference characters designate like parts throughout the same and in which:

Fig. 1 shows a blank from which a form of fastening device may be constructed.

Fig. 2 shows, in front elevation, a fastening device constructed from the blank of Fig. 1 and applied to fastening position in work.

Fig. 3 is a top plan view of Fig. 2, showing the position of the shank sections of the fastening device as applied to a rectangular aperture in work.

Fig. 4 is a section view of Fig. 2 taken along line 4—4 and showing the position of the shank sections of the device as applied to a substantially round aperture in work.

Fig. 5 is a front elevation view of the device of Figs. 1-4 inclusive as applied in fastening position for securing a plurality of layers of work to a supporting structure.

Fig. 6 shows in side elevation a modified construction in which locking means are provided on the rear wall section of the shank.

Fig. 7 is a front elevation of Fig. 6.

Fig. 8 is a section view taken along line 8—8 of Fig. 7.

Fig. 9 represents a blank outline for an alternate construction of fastening device.

Fig. 10 shows in front elevation a fastening device constructed from the blank of Fig. 9 and applied in fastening position in work.

Fig. 11 is a section view of Fig. 10 taken along line 11—11 showing the position of the shank of the device in a substantially round aperture in work.

Fig. 12 represents a blank outline for another form of fastening device.

Fig. 13 shows in front elevation a device constructed from the blank of Fig. 12 and applied to locked fastening position in work.

Fig. 14 is a section view taken along line 14—14 of Fig. 13.

Fig. 15 represents a blank outline for an alternate form of fastening device.

Fig. 16 shows in front elevation a device constructed from the blank of Fig. 15 applied to locked fastening position in work.

Fig. 16a is a side view of Fig. 16.

Fig. 17 is an alternate construction of Fig. 16 about to be applied to work.

Fig. 18 is a section view along line 18—18 of Fig. 16 showing the position of the shank sections and the lug elements carried thereby as applied to a rectangular aperture in work.

Fig. 19 is a similar view as applied to a substantially round aperture in work.

Fig. 20 represents a blank outline for a form of double-ended shank construction.

Fig. 21 is a side view of a double-ended device constructed from the blank of Fig. 20.

Fig. 22 shows in front elevation the device of Fig. 21 as applied to fastening position in a plurality of superposed layers of work.

Fig. 23 represents a blank outline for a modified construction of fastening device.

Fig. 24 shows in front elevation, a device constructed from the blank of Fig. 23.

Fig. 25 is a top plan view of Fig. 24.

Fig. 26 is a section view of the shank of the device of Fig. 24 as applied to a substantially triangular aperture in work.

Fig. 27 is a top plan view of a modified construction adapted for use in a quarter-round aperture in work.

Fig. 28 is a section view of the shank of the device of Fig. 27 showing the position of the shank sections as applied to a quarter-round aperture in work.

Fig. 29 shows in front elevation, the device of Figs. 27 and 28 as applied to fastening position in work.

Fig. 30 shows in front elevation, a fastening device embodying a further shank construction.

Fig. 31 is a top plan view of the device of Fig. 30.

Fig. 32 is a section view of the shank of the device shown in Figs. 30 and 31 as applied to a substantially round aperture in work.

Fig. 33 is a section view of the shank of another modification as applied to a substantially round aperture in work.

Fig. 34 is a section view of a further modification as applied to a rectangular aperture in work.

Fig. 35 shows in section, the construction of the shank of a further modification as applied to a round aperture in work.

Fig. 36 is a similar view as applied to a substantially half-round aperture in work.

Fig. 37 shows applied to work a modified shank construction and in which the head sections of the device are relatively yieldable with respect to the shank.

Fig. 37a is an end view of Fig. 37.

Fig. 38 shows a shank construction in which the teeth on the shank are staggered relative to each other to conform to the contour of the thread of an internally threaded member.

Fig. 39 shows the device of Fig. 38 as provided with a finishing cap, button, or the like.

Fig. 40 is a section view of Fig. 39 taken along line 40—40.

Fig. 41 shows in front elevation a shank construction of a device which may be withdrawn form its applied fastening position in work.

Fig. 42 is a section view of Fig. 41 taken along line 42—42.

Fig. 43 is a side view of the fastening device shown in Fig. 41.

The forms of devices herein disclosed comprise various types of shank structures composed of relatively yieldable sections adapted to be applied and seated in apertured work in a friction or press fit with the side walls of the aperture, which friction or press fit, in certain applications, affords sufficient holding power to the device. In other types of work it is desirable that the device be rigidly retained in fastening position yet be readily withdrawn if desired; in such instances, retaining means may be provided on the shank sections designed to retain the device fixedly in fastening position yet permitting removal of the device without injury thereto such that it may again be used in the same or a similar application.

In other types of work where a fastening device which permanently locks in position must be employed, the shank sections may be provided with pronounced lug, shoulder, or abutment means designed to positively engage in the work aperture such that the device may not move from such position under ordinary vibration, strain and jarring and cannot be manually withdrawn without distorting, mutilating or otherwise injuring the same.

Figs. 1-5 inclusive disclose a form of fastening means which may be constructed from a blank such as represented in Fig. 1. The blank is suitably slit during the stamping operation to provide free end sections at one end thereof and lug, shoulder, or abutment means such as teeth 6, 7 along the outer longitudinal edges of the shank sections. The blank may then be suitably deformed into substantially a channel shape as shown in Fig. 4 to provide a fastening device comprising a shank member composed of relatively yieldable sections 4, 5 and a head member composed of the free end sections 2, 3 suitably deformed as shown in Figs. 2 and 3. The lug, shoulder or abutment means such as 6, 7 are designed to be bent at an angle to the planes of the faces of the longitudinal shank sections 4, 5 such that they are so disposed as to engage the aperture side walls and adjacent underface of the work in most effective relation as shown in Figs. 3 and 4. For example, in Fig. 3, the device is shown applied to a rectangular aperture in which case the teeth are deformed to engage the adjacent aperture side walls substantially at right angles thereto; in Fig. 4 the device is employed in a round aperture in which case the teeth are so disposed as to engage the side walls substantially along a radius of the aperture. A plurality of similar lug means are preferably disposed on the outer longitudinal edges of the shank sections such as to present series of cooperating anchoring means whereby the devices may be utilized for securing various thicknesses of work as, for example, shown in Fig. 2, wherein the device is anchored in a single thickness supporting member M, or, as shown in Fig. 5, where a similar device may be employed for securing a plurality of layers of work W, W' to a supporting sheet metal element M' or the like. The lower, entering portion of the shank is preferably not provided with teeth in order that such end may serve as a pilot portion 8 permitting ready insertion of the device to an aperture in work. To further facilitate application of the device to a work aperture and to permit easy movement of the shank to fastening position, the longitudinal sections of the shank may be suitably deformed to taper toward the pilot portion 8 or to converge toward the entering end of the device.

In application, the shank of the device is inserted into the work aperture and axial force exerted on the head member whereby the yieldable, longitudinal shank sections 4, 5 are contracted and compressed relative to each other against the side walls of the aperture as the shank is advanced to fastening position. This action takes place by reason of the fact that the aperture into which the shank is inserted is of a width less than the normal overall spacing of the effective portions of said shank sections whereby said shank sections must lie under compression against the aperture side walls in fastening position. Thus, the lug, shoulder or abutment means such as teeth 6, 7 on the longitudinal edges of the said shank sections are caused to project beyond the adjacent walls of the aperture to points laterally thereof for most effective fastening engagement. Accordingly, when the device is driven home to desired fastening position, the said teeth 6, 7, effectively engage in locking relation in the work aperture and are maintained in such relation under continuous outward pressure exerted by the shank sections attempting to assume their normal spaced relation.

Figs. 6 to 8 inclusive show an alternate construction in which the shank sections 4, 5 are deformed into a substantially semi-cylindrical configuration as illustrated in Fig. 8. In this form of device, however, additional shoulder, lug, or abutment means such as prongs 9 are struck and deformed to extend out of the plane of the rear wall intermediate the shank sections 4, 5, as shown in Fig. 7. Thus an additional locking means is provided whereby a most effective three-point locking engagement of the device against the adjacent underface of the work is obtained; that is, the teeth 6, 7 are designed to engage at substantially lateral points against the side walls and adjacent underface of the work, and, at the same time prongs 9 engage in the work at still a third point. In operation and use this form of device is substantially similar to that described in connection with Figs. 1 to 5 inclusive.

Figs. 9 to 11 inclusive illustrate a form of fastening means of this invention, wherein the devices are constructed from a blank such as represented in Fig. 9 and are suitably slit at one end in the stamping operation, to provide a plurality of free end sections 11, 12, and 13, which are bent with respect to the blank proper to provide the head member of the device as shown in Fig. 10. The shank member is formed of the blank proper and is composed of longitudinal sections 14, 15 which are deformed into a substantially cylindrical form as shown in section in Fig. 11, such that the device is particularly adapted for use in round apertures in work. The diameter of the substantially cylindrical shank is designed of slightly greater diameter than that of the aperture into which it is applied, and inasmuch as the shank sections 14, 15 are relatively yieldable with respect to each other, a most effective friction fit of the shank in fastening position in the work may be obtained solely from the said yieldable relation of the shank sections contacting the side walls of the aperture, whereby the device may be readily withdrawn from fastening position if desired. In certain applications, where a positive locking of the device in fastening position is desired, lug means such as teeth, 16, 17 may be struck and deformed from said shank sections in such manner as to be adapted to engage the adjacent underface of the work in locked relation thereto; this locked relation is maintained at all times due to the action of the shank sections, under compression against the side walls of the apertures, attempting to assume their normal spaced relation whereby said shank sections tend toward movement outwardly with respect to each other and the lug, shoulder, or abutment means 16, 17 thereon are continually urged in opposite directions toward points spaced laterally of the aperture side-walls, thus causing the device to be retained in positive locked fastening position as shown in Fig. 10. The application and use of devices having such form of shank structure is similar to that described with reference to Figs. 1–5 inclusive.

Figs. 12 to 14 inclusive show a form of device which may be constructed from a blank such as represented in Fig. 12, one end of which is suitably slit to provide sections 22, 23 forming the head member of the device as represented in Fig. 13. The blank is deformed into a substantial channel shape whereby the projections 26, 27 on the longitudinal edges of the shank sections 24, 25 defined shoulders adapted to positively lock in fastening position against the adjacent underface of the apertured work. The device may be readily adapted for use in various thicknesses of work, within limits, by deforming the head sections 22, 23 downwardly with respect to the shank whereby the said head sections have an axial, yieldable, relation relative thereto; this yieldable relation of the head to the shank is such as to cause an axial pull on the shank in fastening position whereby the said shoulders 26, 27 are drawn up into snug, firm engagement with the adjacent underface of the work. In order to facilitate application of the device to fastening position in the work, the shank sections 24, 25 may be tapered toward the pilot 28 or the entering end of the device in a substantially truncated cone configuration; the use of a pilot 28, Fig. 13 is designed to facilitate insertion of the device into the work aperture. The outer longitudinal edges of the sections carrying the shoulders 26, 27 are also tapered toward the entering end of the device to facilitate easy application thereof to the work aperture and also to cause gradual relative contraction of the shank sections 24, 25 as the device is advanced in locking position in the work. It is to be understood that yieldable head sections such as 22, 23 may be employed in any form of shank construction of the devices herein disclosed where it is desired that an axial pull be exerted on the shank by the head member of the device to obtain a snug engagement of the shank elements in fastening position in the work as shown in Fig. 13. It is also to be understood as within the scope of this invention that in any of the shank structures herein disclosed a pilot be employed and that the respective shank sections be suitably tapered toward such pilot or the entering end to facilitate application of the device to the work.

Figs. 15 to 19 inclusive show a form of fastening device which may be constructed from a blank such as represented in Fig. 15 wherein one end of the blank is suitably slit to provide sections 32, 33, forming the head of the device as shown in Fig. 16, and the opposite, entering end may be formed to present a pilot 38, Fig. 17. The shank sections 34, 35 may be tapered toward the entering end or pilot as in Fig. 17 with the outer longitudinal edges thereof suitably slit to provide elements which are deformed out of the plane of such shank sections to provide anchoring means such as prongs 36, 37 adapted to engage the adjacent underface of the work in fastening position as shown in Fig. 16. As shown in Figs. 18 and 19 the shank sections of this form of device, are suitably deformed into a substantially semi-cylindrical configuration and are readily adapted for use in a rectangular aperture, Fig. 18, or in a substantially round aperture as in Fig. 19. In application and use this form of device is similar to that described above in connection with Figs. 1–5 inclusive.

Figs. 20–22 inclusive show a form of double-ended fastening device embodying the shank construction of any of the devices herein shown. For purposes of illustration only, the shank construction of Figs. 1–5 inclusive is represented but it is to be understood that is within the scope of this invention that the double-ended device shown may have incorporated therein other similar forms of shank constructions or any combination thereof, such as, for example, a locking type of shank and an opposite snap-stud type of shank. The double-ended device may be constructed from a blank such as shown in Fig. 20 from which are struck and deformed integral elements 42, 43 serving as head or bearing sections. The blank consists of sections 44, 45 forming one shank of the double-ended device, and sections 44a, 45a comprising the opposite shank. On the respective shank sections, lug, shoulder, or abutment means such as teeth 46, 47 and 46a, 47a are provided. The blank is bent into a substantial channel shape as shown in Fig. 22 with the teeth extending out of the planes of their respective shank sections at an angle suitable for most effective engagement in the work aperture. In application of the form double-ended device shown, one shank is inserted into the aperture in work such as a metal support M, whereupon the work to be superposed thereon, such as a layer of fibrous material W and a sheet metal section M' is applied to the opposite shank and advanced toward the said metal support M until seated in desired fastening position flush with the bearing sections 42, 43 such that relative axial movement of the superposed work pieces is prevented and a positive locked, superposed relation thereof is obtained.

The various shank structures herein shown may be constructed in modified forms such that the shank sections are of irregular configuration and are so disposed as to follow the contour of a specific form of work aperture other than round or rectangular. For example, in Figs. 23–26 inclusive, is illustrated a form of device particularly adapted for use in a triangular aperture. The device may be constructed from a blank such as represented in Fig. 23 which may be bent along the dotted line indicated into a substantial channel shape composed of the shank sections 54, and 55, the free end sections 52, 53 of which are suitably deformed to form the head of the device as shown in Fig. 24. The shank sections are provided with suitable lug, shoulder or abutment means such as teeth 56, 57 adapted to engage the underface of the work to retain the device in applied fastening position.

In Figs. 27–29 inclusive is shown a further modified form of shank particularly adapted for use in a quarter-round aperture in work. In this form the shank section 54a may be suitably deformed to follow the contour of the round portion of the aperture as shown in section in Fig. 28. The cooperating shank section 55a is relatively yieldable with respect thereto such as to continually urge the lug, teeth or abutment means 56a, 57a provided on such shank sections into most effective engagement with the side walls of the aperture and adjacent underface of the work as shown in Fig. 29. At one end the shank may be suitably slit to provide sections 51, 52a, 53a serving as the head member of the device.

In Figs. 30–32 inclusive a modified shank construction is shown which is particularly adapted for use in a round aperture. The device comprises shank sections 64, 64 disposed in such relation as to define a substantial cylindrical channel shape as shown in section in Fig. 32. One end of the channel shape is suitably slit to provide a plurality of head sections 61 as shown in Fig. 31. The shank sections are provided with lug shoulder or abutment means such as teeth 66, 67 adapted to rigidly engage the aperture side-walls and adjacent underface of the work in fastening position.

Fig. 33 shows in section, a further shank construction of a substantial S-shape configuration comprising a main shank section 60 and integral auxiliary shank sections 64a, 65a relatively yieldable with respect to said main section and somewhat transversely dished to follow the contour of the round or oval aperture. The respective auxiliary shank sections may be provided with suitable shoulder or abutment means such as 66a, 67a designed to engage the aperture side walls most effectively. As shown, the lug means 66a, 67a are so disposed as to engage the work aperture at substantially diametrically opposite points whereby extraordinary resistance is offered to withdrawal of the device from fastening position.

Fig. 34 shows a modified construction designed for ready application to a square or rectangular work aperture. The device of this form comprises a shank composed of a main shank section 62 and integral, relatively yieldable auxiliary shank sections 64b, 65b provided with lug, shoulder or abutment means 66b, 67b, disposed in a substantially Z-shape configuration.

Figs. 35 and 36 show a still further modification of shank construction comprising a main shank section 63 and auxiliary shank sections 64c, 65c relatively yieldable with respect thereto and carrying lug, shoulder or abutment means 66c, 67c. The respective shank sections present a channel shape adapted for use in a round aperture as shown in Fig. 35 or a half-round perforation as represented in Fig. 36.

In the various forms of shank structures, the lug, shoulder or abutment means are generally shown as suitably disposed along the free longitudinal edges of the yieldable shank sections and at a suitable angle thereto for most effective engagement with the side-walls of a specific form of aperture. This engagement of the lug means in the work aperture is such that they engage the side-walls thereof in fastening position under pressure of the yieldable shank sections attempting to assume their normal spaced relation. However, it is to be understood as within the scope of this invention, that the lug shoulder or abutment means be provided by other means as by stamping and deforming from the longitudinal edges as shown in Figs. 15 and 16, or struck and deformed from within the outline of the sections as in Figs. 7 and 9.

Figs. 37 and 37a show another form of device which comprises a shank consisting of relatively yieldable, longitudinal shank sections 74, 75 and a head member composed of the free end sections 72, 73. In this form of device the lug, shoulder or abutment means are provided by striking elements 76, 77 from within the longitudinal sections and bending the same in a return bend such that the free ends thereof are disposed as lugs or shoulders adapted to engage the underface of the work as shown in Fig. 37. In order to obtain a more effective engagement of such lugs or shoulders in the work, the elements 76, 77 may be deformed in a suitable manner with respect to the shank sections 74, 75. As shown in Fig. 37a, one method of deforming the lug elements 76, 77 relative to the shank sections involves bending the same at an angle such that they are laterally offset with respect to said shank sections 74, 75 and have portions thereof projecting beyond the free longitudinal edges thereof. Upon application of this form of device to apertured work the said elements 76, 77 are caused to flex laterally against the aperture side walls until clear of the lower underface of the work whereupon they may spring toward their normal offset relation with respect to the shank sections 74, 75 in locking engagement in the work. The head sections 72, 73 may be deformed with respect to the shank such that they are yieldable relative thereto and serve as a take-up means exerting an axial pull on the said shank sections in fastening position, thereby effecting a snug engagement of the shoulders provided by said elements 76, 77, against the adjacent underface of the work.

Fig. 38 discloses a shank construction in which teeth 86, 87 provided on the free longitudinal edges of the shank sections are disposed in staggered relation to conform to the contour of the threads of an internally threaded member such as nut element N. Since the longitudinal shank sections 84, 85, are relatively yieldable, this form of device may be readily snapped into the internally threaded member in the manner of a snap stud; however in order to be withdrawn the device must be rotated in the manner of disengaging a bolt from a nut. The device may also be adapted for ready removal by the use of auxiliary head sections 80, 81 which may be moved toward each other by the fingers of the operator or by a suitable tool, whereby the shank sections 84, 85 are relatively contracted such that the teeth 86, 87 clear the threads of the nut element and the device may be withdrawn. As illustrated in Figs. 39 and 40 the head of the device may be provided with a suitable cap 88 or finishing button by applying the same to the head sections 82, 83 and peening the free edges thereof onto said sections as shown in Fig. 40.

In certain types of work it is necessary that a device be employed which is quickly applied to effective fastening position in the manner of a snap-stud yet may be readily withdrawn and used again in the same or a similar application. In such instances, a device such as shown in Figs. 41–43 inclusive may be employed wherein the shoulder or abutment means on the relatively yieldable shank sections 94, 95 comprise cam elements 96, 97 which define guide edges 90, 91 and work engaging edges 92, 93. On being applied to a work aperture the guide edges 90, 91 effect a gradual contraction of the yieldable shank sections 94, 95 such that the cam elements 96, 97 clear the work aperture and seat the work engaging edges 92, 93 in desired fastening position in the work as shown in Fig. 41. The devices may be readily withdrawn by application of axial force to the head sections 98, 99 whereupon the work engaging edges 92, 93 of the shank cause a gradual, relative contraction of the shank sections sufficient to pass the cam elements 96, 97 to permit the shank to move through the work aperture and the device withdrawn.

What is claimed is:

1. For application to apertured work from one side only of such work, a one-piece fastening device complete in itself and comprising a head, a shank, said shank being in the form of a channel-shape, said channel-shape shank comprising axially disposed, relatively yieldable shank sections and a pilot at one end, said shank sections tapering toward said pilot and having portions thereof spaced apart a distance greater than the size of the aperture in normal, untensioned relation, whereby said pilot facilitates entrance of the device into the aperture and said shank sections are caused to gradually contract from their normal, spaced relation on being advanced in the work and are seated under tension in applied fastening position.

2 For application to apertured work from one side only of such work, a one-piece fastening device complete in itself and comprising a head, a shank, said shank being in the form of a channel-shape, said channel-shape shank comprising axially disposed, relatively yieldable shank sections and a pilot at one end, said shank sections tapering toward said pilot and having portions thereof spaced apart a distance greater than the size of the aperture in normal, untensioned relation, whereby said pilot facilitates entrance of the device into the aperture, and said shank sections are caused to gradually contract from their normal, spaced relation on being advanced in the work and are seated under tension in applied fastening position, the opposite end of said channel-shape being deformed to provide the head member of the device.

3. A fastener for use in apertured work, including a shank, said shank being in the form of a channel-shape, said channel-shape shank comprising axially disposed, relatively yieldable shank sections and a pilot at one end, said shank sections tapering toward said pilot and having portions thereof spaced apart a distance greater than the size of the aperture in normal, untensioned relation, whereby said pilot facilitates entrance of the device into the aperture and said shank sections are caused to gradually contract from their normal spaced relation on being advanced in the work and to be seated under tension in applied fastening position, and integral means extending out of the plane of said shank sections for engaging the adjacent underface of the work, said integral means being continually urged and maintained in applied fastening position by the said shank sections under tension.

4. For application to apertured work from one side only of such work, a one-piece fastening device complete in itself and comprising a head, a shank, said shank being in the form of a channel-shape, said channel-shape shank comprising axially disposed, relatively yieldable shank sections provided with shoulder portions and a pilot at one end, said shank sections tapering toward said pilot and having said shoulder portions thereof spaced apart a distance greater than the size of the aperture in normal, untensioned relation, whereby said pilot facilitates entrance of the device into the aperture and said shank sections are caused to gradually contract from their normal, spaced relation on being advanced in the work and are seated under tension in applied fastening position, the opposite end of said channel-shape being deformed to provide the head member of the device.

5. A fastener for use in apertured work, comprising a head, a shank, said shank being in the form of a channel-shape, said channel-shape shank comprising axially disposed, relatively yieldable shank sections and a pilot at one end, the opposite end being deformed to provide said head, said shank sections tapering toward said pilot and having portions thereof spaced apart a distance greater than the size of the aperture in normal, untensioned relation, whereby said pilot facilitates entrance of the device into the aperture and said shank sections are caused to gradually contract from their normal, spaced relation on being advanced in the work and to be seated under tension in applied fastening position, and integral means extending out of the plane of said shank sections for engaging the adjacent underface of the work, said integral means being continually urged and maintained in applied fastening position by the said shank sections under tension.

6. A fastening device for use in apertured work, comprising a head, a shank, said shank being in the form of a channel-shape, said channel-shape shank comprising axially disposed, relatively yieldable shank sections, one end of said channel-shape being deformed to provide a resilient head member relatively yieldable with respect to said shank, said shank sections tapering toward the opposite end and having portions thereof spaced apart a distance greater than the size of the aperture in normal, untensioned relation, whereby said shank sections are caused to gradually contract from their normal spaced relation on being inserted and advanced in the work aperture and are seated under tension in applied fastening position, and integral means extending out of the plane of said shank sections and engaging the adjacent underface of the work, said integral means being continually urged and maintained in applied fastening position by the said shank sections under tension, the said integral means being also placed under axial tension by axial pull exerted by said relatively yieldable, resilient head member contacting the adjacent upper face of the work.

7. For use in preperforated apertured work having a fastener receiving opening of predetermined size provided therein, a one piece fastening device complete in itself and comprising a shank in the form of substantial channel-shape, said channel-shape shank comprising a plurality of axially disposed, relatively yieldable shank sections, said shank sections at the entering end thereof being so spaced as to have a cross section substantially conforming to and not greater than the predetermined size of said fastener receiving opening thereby presenting a substantial pilot facilitating application of the shank to said opening, said relatively yieldable shank sections otherwise having portions thereof spaced apart in their channel-shape form a distance greater than the size of the fastener receiving opening in normal, untensioned relation, whereby said shank sections are caused to contract bodily from their normal, untensioned spaced relation on being advanced in the fastener receiving opening to seat under tension in applied fastening position therein.

8. For use in preperforated apertured work having a fastener receiving opening of predetermined size provided therein, a one piece fastening device complete in itself and comprising a shank in the form of substantial channel-shape, said channel-shape shank comprising a plurality of axially disposed, relatively yieldable shank sections, said shank sections at the entering end thereof being so spaced as to have a cross section substantially conforming to and not greater than the predetermined size of said fastener receiving opening thereby presenting a substantial pilot facilitating application of the shank to said opening, said relatively yieldable shank sections otherwise having portions thereof spaced apart in their channel-shape form a distance greater than the size of the fastener receiving opening in normal, untensioned relation, at least one of said shank sections being provided with an integral shoulder, whereby said shank sections are caused to contract bodily from their normal, untensioned, spaced relation on being advanced in the fastener receiving opening thereby seating said shoulder under tension in applied fastening position therein, said shoulder being continually urged and maintained in applied fastening position by said shank sections under tension.

HERMAN G. LOMBARD.